(12) United States Patent
Hearne et al.

(10) Patent No.: US 6,701,381 B2
(45) Date of Patent: Mar. 2, 2004

(54) DATA PROCESSING SYSTEM AND DEVELOPMENT METHOD

(75) Inventors: John Hearne, Dublin (IE); Ronan Rooney, Dublin (IE)

(73) Assignee: Kimono Limited, Dublin (IE)

( * ) Notice: Subject to any disclaimer, the term of this patent is extended or adjusted under 35 U.S.C. 154(b) by 290 days.

(21) Appl. No.: 09/796,688

(22) Filed: Mar. 2, 2001

(65) Prior Publication Data

US 2001/0052113 A1 Dec. 13, 2001

Related U.S. Application Data (63) Continuation of application No. PCT/IE99/00089, filed on Sep. 3, 1999.

(30) Foreign Application Priority Data

Sep. 3, 1998 (IE) .................................................. 980734
Sep. 3, 1998 (IE) .................................................. 980735

(51) Int. Cl.$^7$ .............................. G06F 9/44; G06F 9/46
(52) U.S. Cl. ...................... 709/313; 709/203; 717/104; 717/106
(58) Field of Search ........................... 707/103, 4, 101, 707/102; 717/103, 108, 171, 105, 114; 709/203, 204, 217

(56) References Cited

U.S. PATENT DOCUMENTS

| | | | | |
|---|---|---|---|---|
| 5,596,746 A | * | 1/1997 | Shen et al. ................... | 707/101 |
| 5,675,805 A | * | 10/1997 | Boldo et al. ................. | 717/114 |
| 5,848,273 A | * | 12/1998 | Fontana et al. .............. | 717/108 |
| 5,920,725 A | * | 7/1999 | Ma et al. ...................... | 717/171 |
| 5,926,637 A | | 7/1999 | Cline et al. ................... | 395/701 |
| 5,983,233 A | * | 11/1999 | Potonniee .................... | 707/103 |
| 6,018,627 A | * | 1/2000 | Iyengar et al. .............. | 717/103 |
| 6,023,578 A | * | 2/2000 | Birsan et al. ................ | 717/105 |
| 6,208,345 B1 | * | 3/2001 | Sheard et al. ................ | 345/853 |
| 6,292,827 B1 | * | 9/2001 | Raz ............................. | 709/217 |
| 6,374,252 B1 | * | 4/2002 | Althoff et al. ............... | 707/102 |

FOREIGN PATENT DOCUMENTS

| | | |
|---|---|---|
| EP | 0538860 A2 | 4/1993 |
| WO | WO97/38373 | 10/1997 |

OTHER PUBLICATIONS

Communications Week, No. 485, pp. 1 and 47, Dec. 20, 1993, Oracle Case Tools to Simplify Downsizing, John Cox.
Duerr et al, VDM++, A Formal Specification Language for Object–Oriented Designs, Proceedings of the . . . , pp. 214–219, 1992.
Kurtz et al, Object–Oriented Systems Analysis and Specification, A Model . . . , Computer Soc. Int'l. Conf., pp. 328–332, 1990.
Craig Larmen, Applying UML and Patterns, Jan. 1998, pp. 87, 88, 129, 161, 162, 255, 257–259, 267, 273, 295, 298–301.
Mowbray et al, Inside Cobra, Sep. 1997, pp. 34–39 and 72–79.
Buck–Emden et al, Die Client/Server–Technolgie Des Sap–Systems, 1996, pp. 116–118.
Fowler, UML Distilled, 1997, p. 76.

* cited by examiner

*Primary Examiner*—Zarni Maung
*Assistant Examiner*—Dustin Nguyen
(74) *Attorney, Agent, or Firm*—Jacobson Holman PLLC

(57) ABSTRACT

A client/server data processing system is developed by a method (20) in which a meta model (21) is transformed by a model generator (24) into an application model (25) which has a layered structure reflecting that of the end-product system. A code generator is associated with each layer of the application model (25). For the client side, an IDL representation (41) is generated and is transformed into client interfaces (46). Client user interfaces (47) are separately generated.

14 Claims, 7 Drawing Sheets

DATA PROCESSING SYSTEM AND DEVELOPMENT METHOD

This is a continuation of PCT/IE99/00089, filed Sep. 3, 1999.

FIELD OF THE INVENTION

The invention relates to client/server data processing systems and to their development.

PRIOR ART DISCUSSION

Such systems have traditionally been difficult to construct and expensive to maintain, particularly for large applications such as social security data processing. For example, business logic encoded in client applications has led to expensive maintenance. Also, user interface (UI) construction has tended to rely on platform-specific frameworks and so has caused portability problems. Also, many middleware products provided relatively low-level APIs to developers, necessitating a large extent of manual coding to "bolt" the user interface onto client/server interfaces.

OBJECTS OF THE INVENTION

It is an object of the invention to provide for highly automated client/server system development to shorten development lead time and to improve quality.

SUMMARY OF THE INVENTION

According to the invention, there is provided a method for generating a client/server data processing system comprising the steps of:

- developing a meta model of objects defining required processing logic;
- a model generator automatically transforming the meta model into an application model of objects required for the data processing system;
- a code generator automatically transforming the application model to a server by generating code for the application model objects;
- an interface definition generator automatically generating an interface definition client representation, and a client interface generator automatically transforming said representation into code for client interfaces to server functions;
- completing a client by developing client user interface code; and
- loading the server and client code onto a hardware platform to complete a client/server data processing system.

In one embodiment, the meta model comprises process and entity objects developed in a case environment.

In one embodiment, the model generator executes mappings between meta model domains and application model domains.

In one embodiment, the mappings have a one-to-many relationship between domains in the meta model and those in the application model.

In another embodiment, the application model comprises:
- an interface layer of objects;
- a business object layer of objects; and
- a data access layer of objects.

In one embodiment, a separate code generator transforms each layer of the application model.

In one embodiment, each code generator performs a semantic analysis of objects in the associated application model layer and uses code templates to generate code.

Preferably, the code templates include facilities for data inserts, data updates, singleton, and cursor-based reads, and optimistic locking.

In one embodiment, the client interface generator generates mapping objects and CORBA stubs.

In one embodiment, the mapping objects map user interface widgets to the CORBA stubs.

In a further embodiment, the maps are operable to capture data from a user interface screen.

Preferably, the maps are operable to perform data validation.

In one embodiment, the maps are operable to perform data conversion from user interface text to Java IDL mappings.

In one embodiment, the maps are operable to use converted data to access the server.

In one embodiment, the client interface generator parses the interface definition representation to determine services offered by the server to the client.

In another embodiment, the method comprises a step of generating rules for the server interface and business object layers by using a framework comprising a high-level graphical editor which allows a user to develop rules in a rule language, and a generator which generates source code from the rule language.

In one embodiment, the executable section comprises mathematical functions and tracing functions linking rate outputs back to high-level rule definition in the editor, and the editor generates a display of rule evidence, reasoning, and a result According to another aspect, the invention provides a client/server data processing system whenever generated by a method as defined above.

According to a further aspect, the invention provides a computer program product directly loadable into the memory of a digital computer and comprising the server and client code generated by the method defined above.

DETAILED DESCRIPTION OF THE DRAWINGS

Brief Description of the Drawings

The invention will be more clearly understood from the following description of some embodiments thereof given by way of example only with reference to the accompanying drawings in which.

DESCRIPTION OF THE EMBODIMENTS

Figure 1:
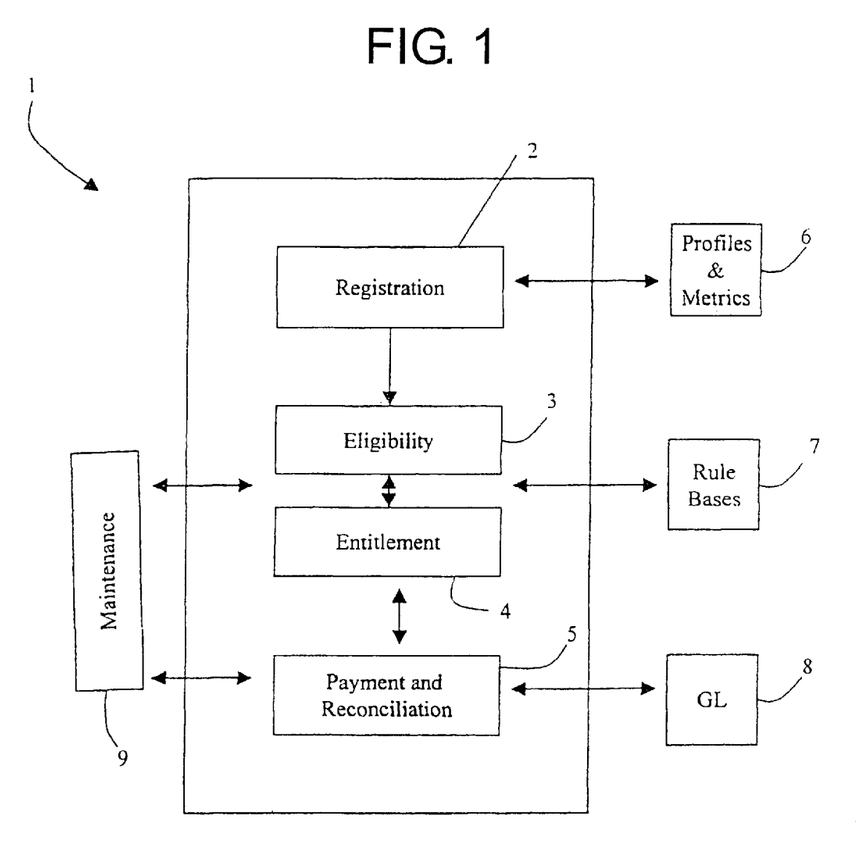
FIG. 1 is a block diagram of a data processing system.

Referring to FIG. 1, a data processing system 1 implements social security applications. Routing of data is indicated by the arrows in the diagram. The system deals with case registration 2, eligibility 3, entitlement 4, and payment and reconciliation 5 applications. These are executed with use of profiles and metrics 6, rule bases 7, a general ledger 8, and a maintenance function 9. These functions are in a server structure comprising server interface, business object and data access layers and a client which interfaces with the server interface layer. The system also comprises a rules framework for simple development of the rules. This allows the rules to be modified frequently, which is important for day-to-day operation of the system 1 because of frequent changes to transactions and computations.

Figure 2:
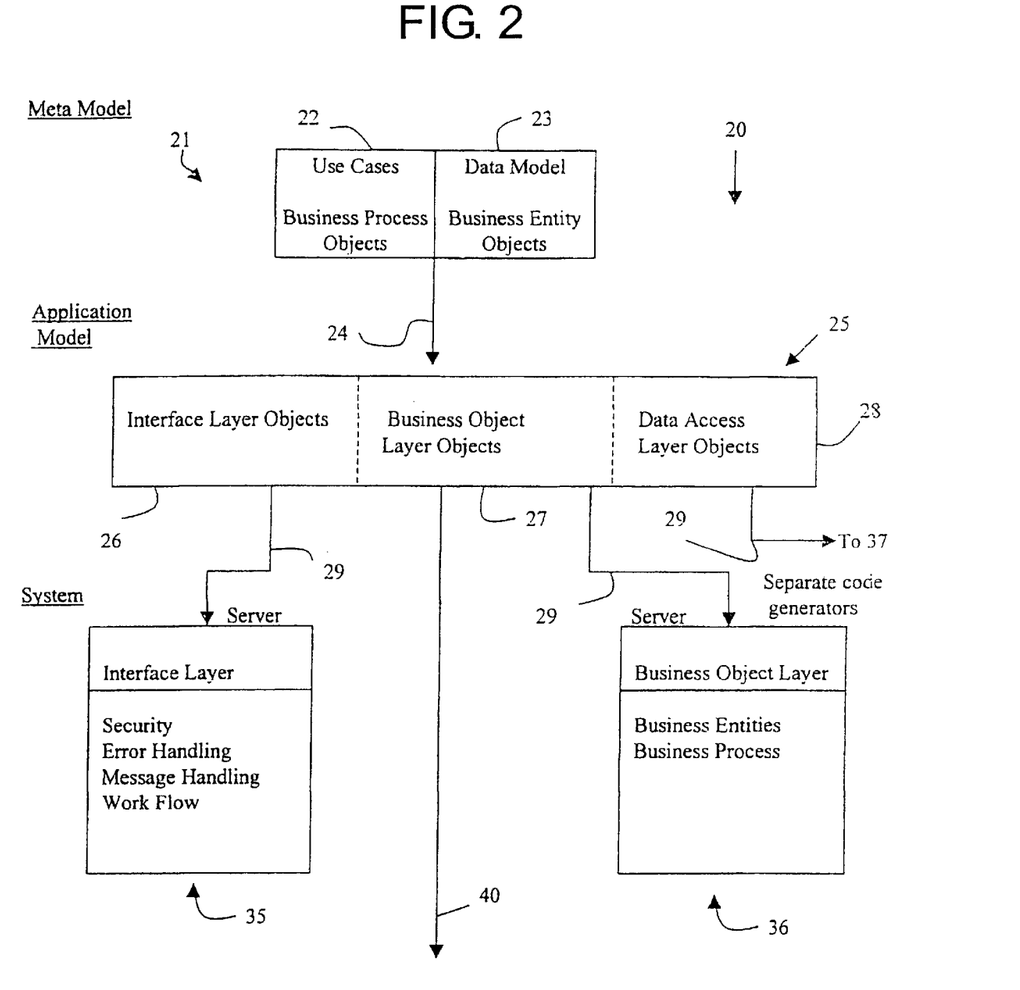
FIGS. 2 and 3 are a flow diagram showing a method for generating the data processing system.
Figure 3:
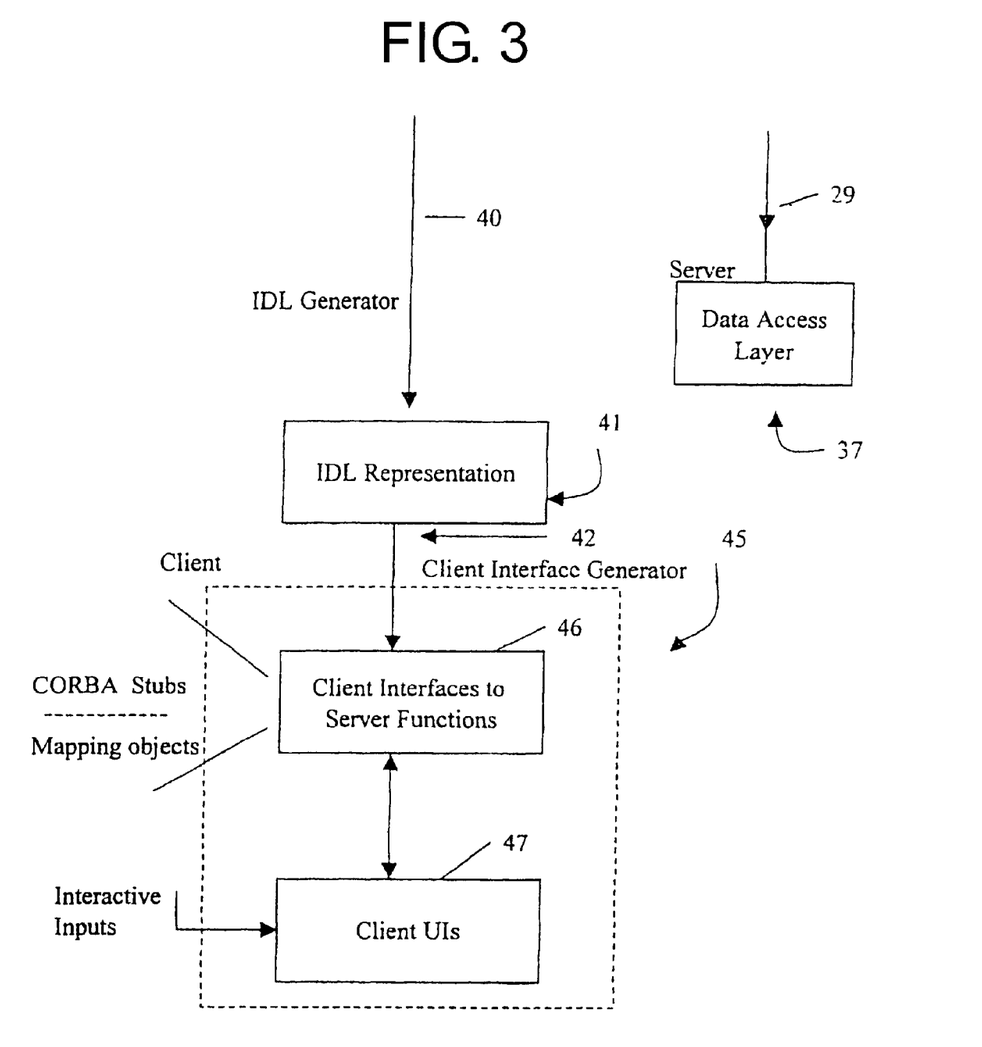

The system 1 is generated by a method 20 illustrated in FIGS. 2 and 3. The method 20 starts with use of a meta model 21 having use cases 22 and a data model 23. The use cases 22 comprise business process objects and the data model comprises business entity objects. A process object may be a process such as a social security claim, and an entity object may be a business organisation or an individual. These objects are generated in a Unified Modelling Language in an object oriented case environment. The case environment may be provided by the product marketed as Rational Rose™. The case environment generates a template document which provides a model structure generated by a case view application.

The meta model 21 has links which allow a model generator 24 to bring the development process to a next stage. These links comprise design patterns which create a class model whereby there are relationships between meta model objects and objects in an application model 25 generated by the model generator 24.

The model generator 24 executes mappings which translate attributes between the objects of the models. The mappings are more particularly between domains in the objects, and there is a set of mappings for each domain. For example, one domain may be a floating point data type, and another a string data type.

An important aspect Is that a domain in the meta model may be mapped by different mappings to different domains in the application model 25. For example, a date domain may be mapped to a simple date format in one part of the application model but to an IDL (Interface Definition Language) CORBA string in another. This is because the application model comprises three sections, namely an interface layer 26, a business object layer 27, and a data access layer 28. These layers reflect the architecture of the server side of the proposed completed system.

A single code generator 29 operates for each layer of the application model 25 to transform it to executable code. Thus, one code generator 29 generates a server interface layer 35, another generates a server business object layer 36, and another generates a data access layer 37.

The interface layer 35 presents a CORBA-compliant interface to business functions which can be used by a client program. It also interacts with third-party middleware components to ensure security, consistency, and atomicity of the transactions that execute in business functions. The business object layer implements all of the server's business functionality. The business entity objects represent the basic business entities modelled by the server and the business process objects implement the business logic. The data access layer 37 is responsible for all interactions with back-end RDBMS or legacy database systems This basic layered structure is very effective for client/server system and it is generated automatically by the steps of the method 20.

The steps of transformation from the meta model 21 to the application model 25 with the above layered structure is important because the meta model models the business processes and entities and these are the functional core of the final system. Extensions to business logic may be implemented in a simple and clear manner by adding new functions to existing meta model objects or by sub-classing existing objects. Sub-classing can be used to avoid breaking the existing interface to an object and the developer can choose which business objects are "front-ended" by interface objects in the final system. Data maintenance functions are implemented as maintenance operations on business entity objects.

The code generators 29 perform a semantic analysis of objects in the application model 25 and they use code templates to generate code to implement objects in the layers 35, 36, and 37. The templates include facilities for functions such as data inserts, data updates, singleton and cursor-based reads, optimistic locking, security checking, auditing, and transaction control.

The method 20 generates the system client side by operation of an IDL generator 40 generating an IDL representation 41 of the client functions. The IDL generator 40 maps IDL constructs onto their Java equivalents according to the OMG-specified Java language bindings for IDL. For example, IDL modules, interfaces and methods appear as Java packages, interfaces and methods respectively. IDL primitive datatypes passed as "in" arguments to methods are mapped to the equivalent Java primitive types. Datatypes passed as "inout" or "out" arguments to methods require the use of "holder" datatypes which allow Java to simulate the required pass-by-reference semantics of these argument types.

The following is an example IDL definition, and equivalent IDL compiler-generated Java:

```
//IDL:
    interface AltIdProcess {
        void ReadAltId (
            in ::CMS::AltIdKey key,
            out ::CMS::AltIdDetails details
        );
        void UpdateAltId (
            in ::CMS::AltIdKey key,
            in ::CMS::AltIdDetails details
        );
        void DeleteAltId (
            in ::CMS::AltIdKey key
        );
        void ReadMultiAltId (
            in ::CMS::AltIdRmKey rmkey,
            out ::CMS::AltIdList list
        );
    };
// Java:
public interface AltIdprocess extends
org.omg.CORBA.Object {
    public void ReadAltId (
        CMS.AltIdKey key,
        CMS.AltIdDetailsHolder details
    );
    public void UpdateAltId (
        CMS.AltIdKey key,
        CMS.AltIdDetails details
    );
    public void DeleteAltId (
        CMS.AltIdKey key
    );
    public void ReadMultiAltId (
        CMS.AltIdRmKey rmkey,
        CMS.AltIdListHolder list
    );
};
```

The use of holder datatypes for arguments other than input arguments will be noted. In this example the arguments are IDL structs. The IDL generator 40 generates separate Java classes to represent the structs and their holder varieties Regarding the infrastructure functions, these are primarily in the interface layer. The following are the main aspects:

Primitive datatypes are not required,

Composite datatypes are not required,

Holder datatypes are not required,

There is automatic data validation and conversion,

There is automatic instantiation and pooling of CORBA proxy classes.

In more detail, the infrastructure functions provide a variety of facilities to make interaction with CORBA interfaces easier for the application developer. The main features are as follows:

(a) Primitive datatypes are not required—the developer passes all CORBA method arguments as strings, which are easier to handle from a user interface development perspective. Strings are converted internally to the datatypes required before making a method call.

(b) Composite datatypes are not required—where a method argument is a composite type, such as a struct, the method "flattens" the datatype out into its constituent primitive components. The developer can set these primitives as strings, as described in the preceding paragraph.

(c) Holder datatypes are not required—the method can maintain a cache of data items containing the arguments required for a given CORBA method call. When an argument is not an input argument to a method, the required holder datatype in automatically constructed.

(d) Automatic data validation and conversion—when string values are used as method arguments (as described in (a)), there is an automatic check that the string value is appropriate for conversion to the required primitive datatype, and then performs the conversion. Conversions can be performed for primitive datatypes, and can be written for user-defined datatypes created with IDL "typedef" statements, where the IDL typedef unwinds to a primitive datatype.

(e) Automatic instantiation and pooling of CORBA proxy classes—the CORBA proxy objects required before a server method can be called are automatically created on demand, and are stored in a pool of proxies for later re-use.

All of the above facilities taken together mean that the client developer does not have to write any CORBA-specific client code in order to effect client/server interactions.

The relationship of the Helpers layer to the Infrastructure layer is analogous to the relationship of the CORBA Proxies to the ORB middleware. The lower-level layer contains fundamental infrastructure facilities, while the upper layer contains generated glue code, specific to particular client/server interfaces.

Like the CORBA proxies, Helpers are generated by processing of the IDL-defined interfaces for a given CORBA application. In the case of CORBA proxies, this is performed by the ORB vendor-supplied IDL compiler. Helpers are generated by a custom-written IDL processor.

For each method of an IDL interface, there are generated Helper classes which:

(a) contain a cache of data items which can be used as arguments to the specific IDL method (b) capture attributes of method arguments, such as their datatype, and whether they are in, out, or inout arguments. This information is used to decide how and when data validation and conversion should be performed for the specific IDL method call.

(c) provide a Java Beans™ interface to the IDL method, where method arguments are represented as Bean™ properties, and the method call itself is represented as a method feature of the Bean™.

(d) allow simple wiring of user interface components to the generated Java Beans™ within the IBM Visual Age for Java™ IDE.

A client interface generator 42 uses the IDL representation to generate part of the client 45, namely client interfaces to server functions 46. Client user interfaces (UIs) 47 are separately generated interactively by developers in conjunction with users.

The section 46 of the client comprises CORBA stubs (low-level facilities for CORBA interfacing) and mapping objects. The mapping objects map UI widgets to CORBA stubs to perform the following functions:

collection of data from a UI screen;

data validation;

data conversion from UI text to Java IDL mappings; and use of converted data to call server via CORBA stubs and a reverse path.

The mapping objects are created automatically by loading IDL into a CORBA interface repository, parsing the contents of the interface repository, and collecting data about data type domains. The generator 42 parses the interface definitions and operation definitions to determine services offered by the server to the client.

The completed system comprises the server sections 35, 36, and 37 together with the client 45.

Figure 4:
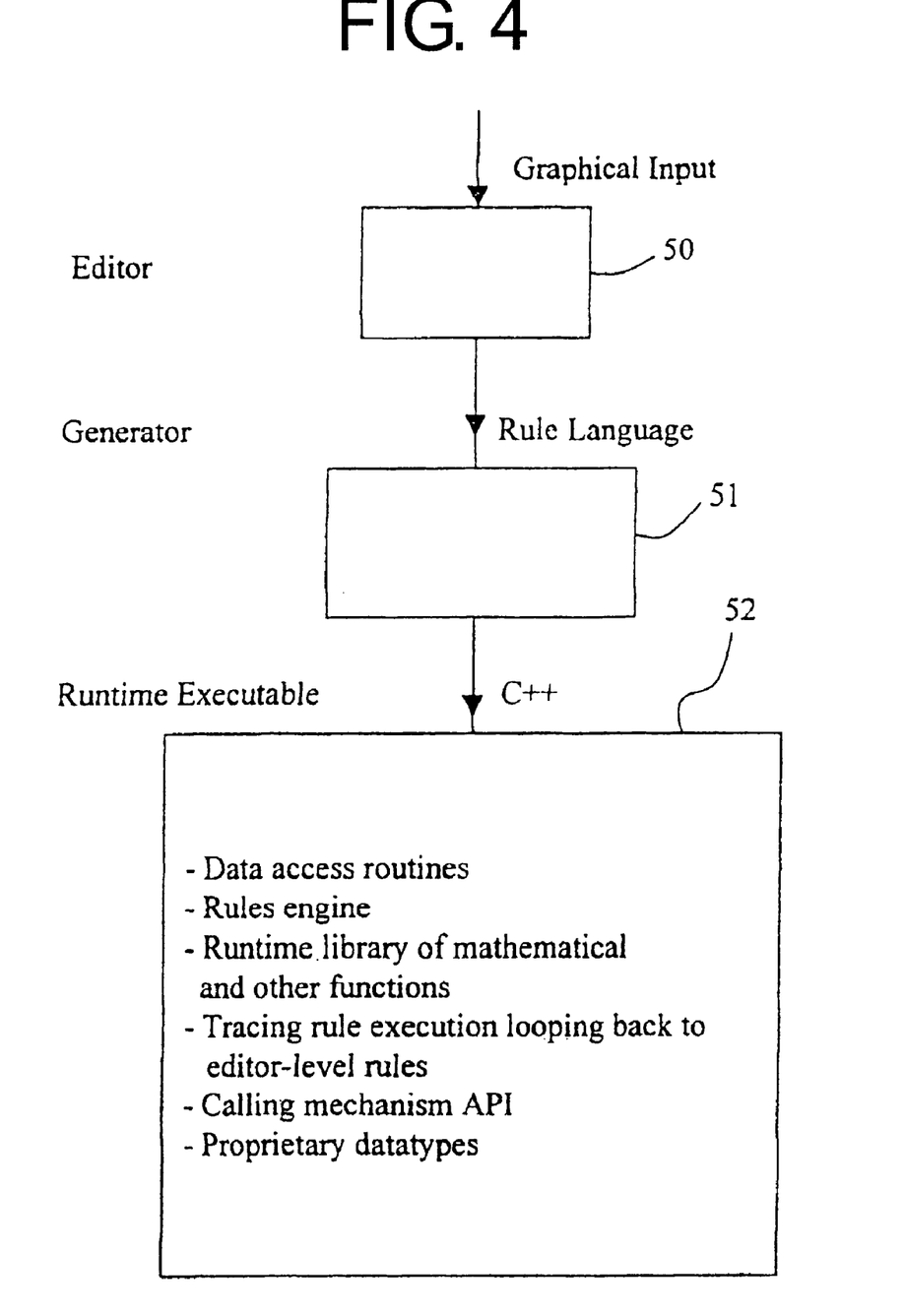
FIG. 4 is a diagram of a rules framework for generating ruless.

However, the three layers, and particularly the business object layer 36, are subsequently augmented by rules defining performance of transactions and computations. These are generated by a rules framework which is illustrated in FIG. 4. The rules framework comprises a rule editor 50 which is used by a developer to generate rules at a high level. The edited rules are in a rule language which is converted to C++ by a generator 51 to provide compiled runtime executable rule code 52.

In more detail, the editor generates rules in a rule tree or hierarchy having in turn from top down:

a product which defines a business entity to which the rule tree is applicable;

one or more rate components, one for each element of the product;

a group which forms assemblies of rules; and rules which operate as a logical condition which determines the decision status of its parent component.

The editor 50 allows a user to input a high level rule such as:

IFTotalContributions>=39

ANDCurrentContributions>=39

ANDCurrentPaid Contributions≧13

A group may be edited by inputting a name such as:

ClientDetails

High level functions are provided by the editor 50 to allow a user to add new nodes to the rule tree and to add items to the library of the runtime executable component 52.

For selection of an element from a data model of shared business components, the editor 50 executes a Wizard which "walks" the user through the following sequence of steps:

1. Select "Read from database" or "Local Variable". "Local Variable" selection allows a name to be entered and it then completes selection. "Read from database" leads to step 2 below.

2. Select items from a table and group them into such things as "Client details", "Address details", and "Correspondence details".

3. Select fields of the selected table and assign them to variables such as:

intermediate value, result value, and code table value.

If "intermediate value" is chosen, the Wizard may proceed to allow use of the values to access further tables.

The editor stores a tree view and links between tree nodes and data access for immediate and clear user viewing.

As illustrated in the drawing, the editor 50 converts the edited rules into a rule language and outputs the rule language to a rule generator 51. This in turn automatically translates the rule language into C++, in turn compiled into runtime executable code. This code provides the data access routines defined using the Wizard. It also provides a rule engine which stores and executes the generated rules. The executable section 52 also comprises a runtime library of mathematical functions. An important component of the executable section 52 is a logging or tracing component which is linked to the rules in the rule trees defined at a high level in the editor 50. This allows for transparency and justification of rule outputs. More particularly, it allows the editor 50 to display Justification in the form of rule evidence, reasoning, and a result. This is important as it helps a user to understand how the results were determined. For example, a social security official can easily explain to a beneficiary the manner in which a computation for social welfare benefit has been calculated.

The editor is programmed to generate screens to allow a user to input the test data, to define a rule, and verify. The test execution involves parsing the rule tree and evaluating each node in turn down the hierarchy. The process determines the value of any formula contained in any node.

The executable section 52 includes API interfaces to allow hooks to the server framework. This allows integration into applications.

Finally, the executable section 52 comprises proprietary datatypes.

In the end-product system, the server constitutes the middle-tier of a three-tier client/server application. At the front end, the server presents a CORBA interface to client applications. At the back end, the server interacts with an RDBMS to provide relational data storage. The server architecture is illustrated at a high level in sections 35, 36, 3, and 45 of FIGS. 2 and 3. The business interface layer presents a CORBA client interface to business functions that can be used by a client program. It also interacts with third-party middleware components to ensure consistency and atomicity of the transactions that execute in business functions. The business object layer implements all of the business functionality. The business process objects implement the business logic and are responsible for manipulating business entity objects in a business-specific manner. The data access layer is responsible for all interactions with the back-end RDBMS. This layered architecture embodies the approach of separating "presentation", "processing", and "persistence".

Figure 5:
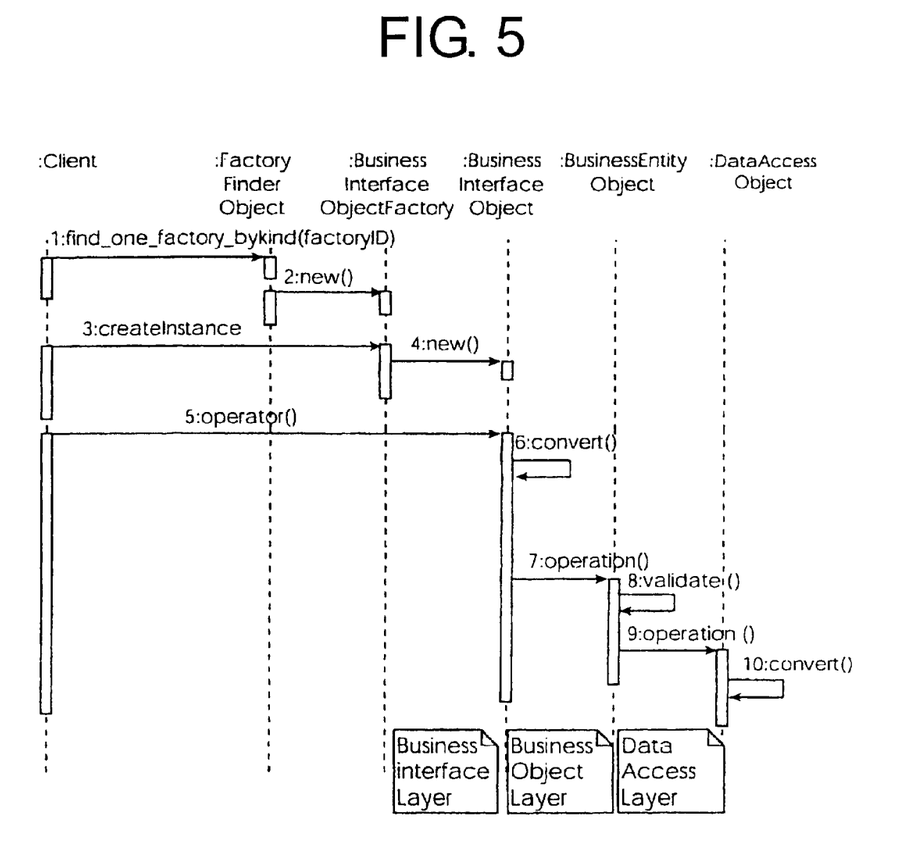
FIGS. 5 to 7 are diagrams illustrating functions of the system.

The objects include "factory objects" which are used to implement the problem domain objects. A factory finder mechanism is used to locate these factory objects and thus to access problem domain objects. FIG. 5 shows a data maintenance function. This is implemented as a read, insert, modify, or remove function on an object. In the data access layer, this translates into the corresponding singleton operation on the back end database.

Figure 6:
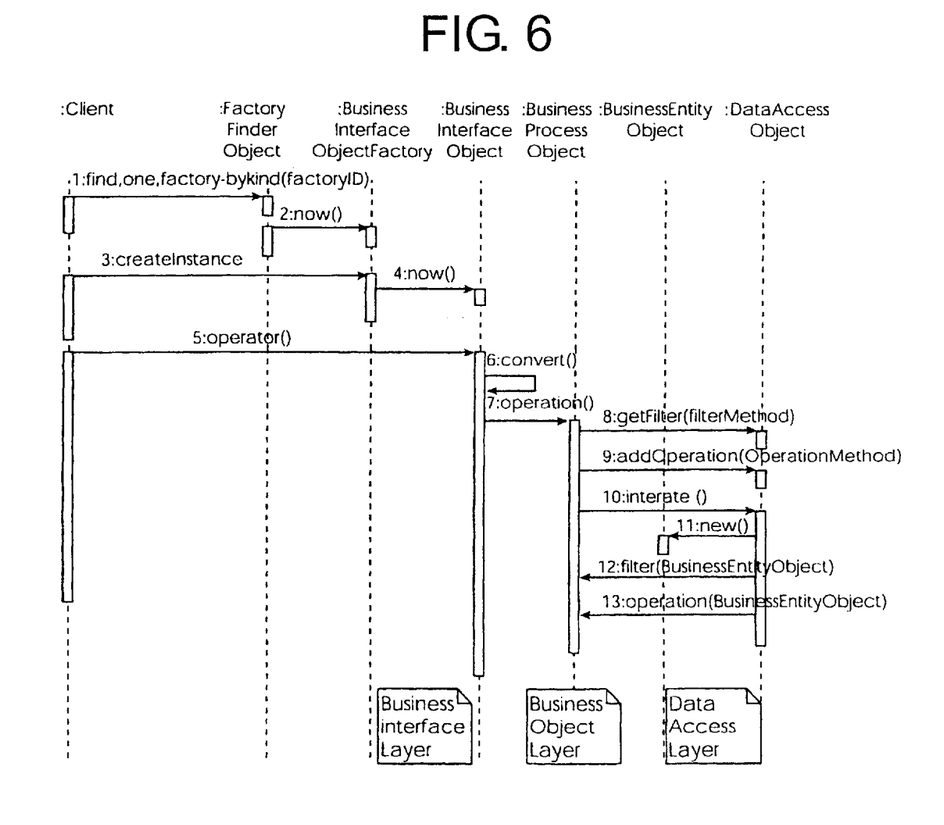

Data iterator functions operate on a set of entities. In a relational database, this corresponds to iterating across a set of records identified by a non-unique or partial key. Data iterator functions are typically used by business processes which return a summary list of entity descriptions to a client. A sequence is shown in FIG. 6. This diagram introduces a data iterator object class. This object iterates across a selection of business entity objects based on selection criteria encoded within the data iterator object itself. Each business entity object selected is passed to optional filters which may apply further selection criteria, and passes the resulting business entity objects to optional operations.

Figure 7:
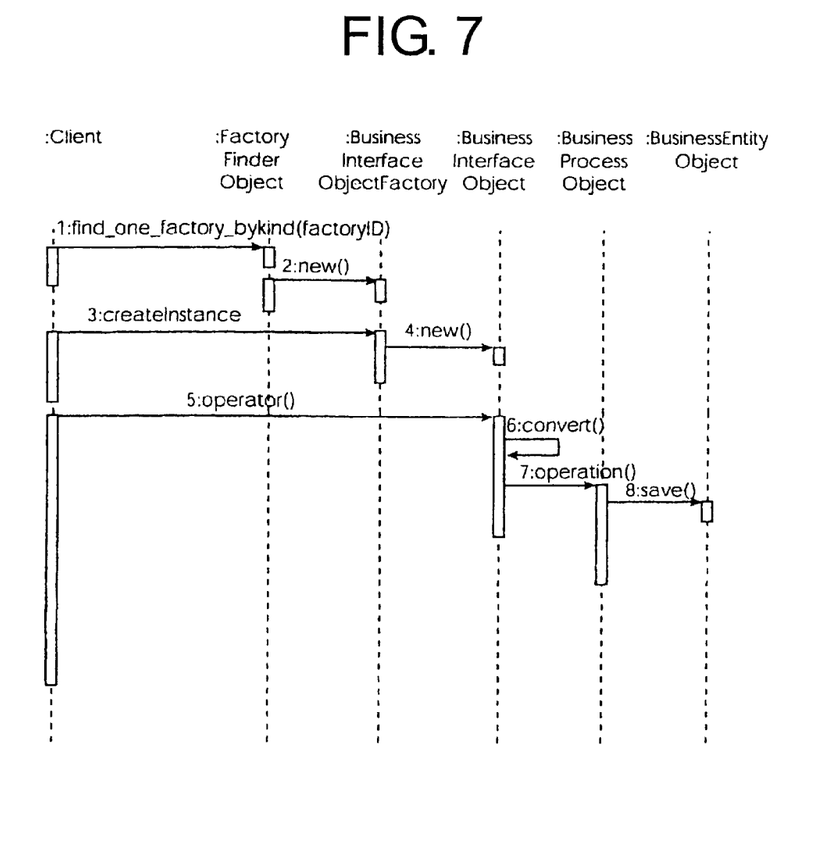

Complex business functions implemented by business process objects may use any combination of other business process objects and business entity objects. The business process objects are arbitrarily complex and by their nature can not be algorithmically generated. However, these types of functions include the same type of business interface layer processing as other types and this may be partly generated by the system infrastructure. A diagram is shown in FIG. 7.

It will be appreciated that the invention provides a structured and highly automated method for generating a client/server system. It allows the business logic to be created and also modified in a simple and effective manner by modification of the meta model. This logic is then propagated by the method to generate the required server and client system functionality. The business logic is automatically encoded on the server side and so avoids the prior problems related to encoding in client applications. The client structure of CORBA middleware below user interface development in a simple manner avoids the need for developers to work in lower-level Java or CORBA IDL datatypes. Because the client objects are generated in an integral manner with the server objects, there is a "seamless" and "transparent" method for the client to instantiate remote objects and perform operations on them.

The invention is not limited to the embodiments described but may be varied in construction and detail within the scope of the claims.

What is claimed is:

1. A method for generating a client/server data processing system, the method comprising the steps of:

developing a meta model of the data processing system, the meta model comprising meta model objects comprising business process objects, business entity objects, and design pattern links;

employing a model generator for automatically transforming the meta model into an application model of objects required for the data processing system by:
executing mappings which translate attributes between the meta model objects and the application model objects, the mappings being executed for the design pattern links, and there being a set of mappings for each domain of the objects,
in which the application model comprises an interface layer, a business layer, and a data access layer, employing a code generator associated with each layer of the application model for transforming its associated layer into code for a corresponding layer of a server for the data processing system, each code generator performing a semantic analysis of application model objects and using code templates to generate the code for each layer;

employing an IDL generator using the objects of the server business layer to generate an IDL client representation of client functions for the data processing system;

employing a client interface generator automatically transforming the IDL client representation into client code for client interfaces to server functions;

completing the client code by developing client user interface code; and loading the server and client code onto a hardware platform to complete the data processing system.

2. A method as claimed in claim 1, wherein the meta model process and entity objects are developed in a case environment.

3. A method as claimed in claim 1, wherein the mappings have a one-to-many relationship between domains in the meta model and those in the application model.

4. A method as claimed in claim 1, wherein the code generator code templates include facilities for data inserts, data updates, singleton, and cursor-based reads, and optimistic locking.

5. A method as claimed in claim 1, wherein the client interface generator generates mapping objects and CORBA stubs.

6. A method as claimed in claim 5, wherein the mapping objects map user interface widgets to the CORBA stubs.

7. A method as claimed in claim 6, wherein the mapping objects are operable to capture data from a user interface screen.

8. A method as claimed in claim 6, wherein the mapping objects are operable to perform data validation.

9. A method as claimed in claim 6, wherein the mapping objects are operable to perform data conversion from user interface text to Java IDL mappings.

10. A method as claimed in claim 6, wherein the mapping objects are operable to use converted data to access the server.

11. A method as claimed in claim 1, wherein the client interface generator parses the interface definition client representation to determine services offered by the server to the client.

12. A method as claimed in claim 1, further comprising the step of generating rules for the server interface and business object layers by using a framework comprising a high-level graphical editor which allows a user to develop rules in a rule language, and a generator which generates source code from the rule language.

13. A method as claimed in claim 12, wherein the executable section comprises mathematical functions and tracing functions linking rate outputs back to high-level rule definition in the graphical editor, and the graphical editor generates a display of rule evidence, reasoning, and a result.

14. A computer program product comprising server and client software code executed by a computer for performing the steps of:

developing a meta model of the data processing system, the meta model comprising business process objects, business entity objects, and design pattern links;

employing a model generator for automatically transforming the meta model into an application model of objects required for the data processing system by:

executing mappings which translate attributes between the meta model objects and the application model objects, the mappings being executed for the design pattern links, and there being a set of mappings for each domain of the objects, in which the application model comprises an interface layer, a business layer, and a data access layer, employing a code generator associated with each layer of the application model for transforming its associated layer into code for a corresponding layer of a server for the data processing system, each code generator performing a semantic analysis of application model objects and using code templates to generate the code and using code templates to generate the code for each layer;

employing an IDL generator using the objects of the server business layer to generate an IDL client representation of client functions for the data processing system;

employing a client interface generator automatically transforming the client representation into client code for client interfaces to server functions;

completing the client code by developing client user interface code; and loading the server and client code onto a hardware platform to complete the data processing system.

* * * * *